US008884877B2

(12) United States Patent
Caritu et al.

(10) Patent No.: US 8,884,877 B2
(45) Date of Patent: Nov. 11, 2014

(54) POINTING DEVICE

(75) Inventors: Yanis Caritu, Saint Joseph la Riviere (FR); Sébastien Riccardi, Brezins (FR); Olivier Neyton, Pressins (FR)

(73) Assignee: Movea, Grenoble (FR)

( * ) Notice: Subject to any disclaimer, the term of this patent is extended or adjusted under 35 U.S.C. 154(b) by 801 days.

(21) Appl. No.: 13/097,799

(22) Filed: Apr. 29, 2011

(65) Prior Publication Data

US 2012/0274560 A1 Nov. 1, 2012

(51) Int. Cl.
*G06F 3/033* (2013.01)
*G06F 3/0346* (2013.01)

(52) U.S. Cl.
CPC .................................. *G06F 3/0346* (2013.01)
USPC ............. 345/158; 345/156; 345/163; 463/36; 463/37

(58) Field of Classification Search
CPC ..... G06F 3/0346; G06F 3/017; G06F 3/0383; G06F 3/033; G06F 2200/1637; H04N 2005/4428; H04N 5/4403; H04N 2005/4432; A63F 13/06; A63F 2300/105; A63F 2300/1006
USPC ............ 345/158, 156, 163, 157, 169; 463/36, 463/37; 702/141, 151, 152, 153; 348/734, 348/601; 340/12.22
See application file for complete search history.

(56) References Cited

U.S. PATENT DOCUMENTS

| | | | |
|---|---|---|---|
| 7,239,301 B2 * | 7/2007 | Liberty et al. | 345/158 |
| 2007/0299626 A1 * | 12/2007 | Song et al. | 702/151 |
| 2009/0326857 A1 * | 12/2009 | Mathews et al. | 702/141 |

* cited by examiner

*Primary Examiner* — Koosha Sharifi-Tafreshi
(74) *Attorney, Agent, or Firm* — Stroock & Stroock & Lavan LLP

(57) ABSTRACT

An improved air pointing device which is capable of compensating for the roll angle imparted to said device by a user of said device. The device of the invention includes at least two gyrometers and two accelerometers, the latter being each used for different roll angles. The correction of the roll angle is effected by using the measurements of the first accelerometer, the output of the second accelerometer being simulated as an approximated function of the measurements of the first accelerometer, using a polynomial approximation of the relation between the output of the two accelerometers, the order of the polynomial being chosen as a function of the computing power which is available and the precision which is needed. In an embodiment of the invention, the first and second accelerometers are advantageously swapped at a value of the roll angle which is substantially equal to 45°.

22 Claims, 11 Drawing Sheets

POINTING DEVICE

FIELD OF THE INVENTION

The present invention deals with a man machine interface capable of sending commands to electronic devices. More specifically, it improves the capability of air pointers to control the movements of a cursor on a display. The display can be a computer display, a TV screen connected to a set-top box, a game console, etc. . . . The air pointer can be a 3D mouse, a smart phone equipped with motion sensors or even a finger or a limb of a user equipped with a sensors/processing assembly.

BACKGROUND

The air pointers may have diverse functions, notably: remote control of an audiovisual apparatus (television, reader/recorder of disks, hi-fi system), where the point is a program or a function to be chosen from a menu; remote control of a household apparatus where the pointer designates the apparatus and has it execute a function; computer remote control where the pointer is programmed as a function of the applications executed by the computer; electronic games interface where, depending on the game, the pointer may be an object manipulated by the user (golf club, tennis racket, bowling ball, handgun, hip gun or rifle, etc.); assistance for the man-machine interface or remote control intended for persons with reduced mobility (for example, fixing of a pointer to the head, the spectacles, an earpiece, or any other part tied to the movements of the head, so as to aid persons with motion deficiency or who are unable to use a conventional hand-held mouse to direct a pointer at the screen). In general, the pointer is equipped with buttons which allow selection of a command, which can be programmed to execute a function (or a service) or to associate a different pointer state during the pointing gesture (trajectory with button pressed vs trajectory with button released, thereby making it possible for example to take as information not the situation of a point on the screen but a cursor trajectory that may itself be associated with an action, etc.).

The movements of the pointer in space comprise rotations and translations. They can be measured by sensors of various types: image sensors can measure rotations and translations at one and the same time by comparison of successive images and geometric transformations; a magnetometer, an accelerometer or a single-axis gyrometer can measure a rotation about said axis; a combination of magnetometers, accelerometers and/or of gyrometers can measure the translations and rotations about several axes; a combination of sensors of the previous types improve measurement accuracy, redundancy allowing determination of confidence intervals; the combination can comprise one or more cameras and several magnetometric, accelerometric and/or gyrometric sensors.

Another rotation sensor, insensitive to accelerations, may be a brightness sensor. If it is a photoelectric cell, it is known that the amount of light received by said cell is proportional to its light receiving area and to the cosine of the angle of inclination of the rays with its normal. The light source may be the sun, or some other quasi-pointlike source, bulb type, situated far enough away for its emission rays to be considered parallel to one another over the whole of the volume of the gestural experience. To avoid problems of changeable ambient brightness, it is advantageously possible to use a "fly's eye" multi-facet type sensor, the angular direction of reception being the facet which measures the highest luminous flux.

The general problem that these applications of motion sensing pointers must solve is to take account of the manner in which the user holds the pointer, in particular of the orientation thereof in space. Indeed, if the pointer is held for example at 45° instead of being held horizontally, a horizontal or vertical motion of the pointer will be conveyed on the screen at which it points by a diagonal motion. This phenomenon is known by the name "tilt" or torsion. It should therefore be corrected in order for the pointer to be usable.

A first procedure for solving this problem is to provide mechanical means so that the sensors remain in a substantially fixed position in the frame of reference of the screen when the user imparts a torsion motion to the pointer. It is thus possible to provide for the sensor or sensors to be mobile within the pointer in the manner of a pendulum whose base has sufficient inertia to remain substantially fixed in spite of the torsion movements imparted to the pointer. Such a device is disclosed by U.S. Pat. No. 5,453,758, which is incorporated by reference herein. It is also possible to encapsulate said sensors in a stabilization device consisting of a pair of spheres tied to the pointer by rotation axles, as is the case in a compass aboard a boat or an aircraft. Such a device is disclosed by U.S. Pat. No. 5,440,326, which is incorporated by reference herein. A first drawback of these mechanical devices for compensating for the torsion of the pointer is that they are limited to restricted spans of angles of torsion and of rate of displacement. A second drawback is that these devices are bulky. A third drawback resides in the mechanical inertia of these devices and the delay in the horizontal alignment induced, thus barring them from real-time pointing applications.

A second procedure for compensating for this torsion of the pointer consists in computing the angles of torsion by using the measurements of some of the sensors embedded aboard the pointer, notably accelerometers, and to thereafter perform a transformation of the measurements of the other sensors from the frame of reference of the pointer into that of the screen by applying to said measurements one or more rotation matrices whose coefficients are dependent on the torsion angle or angles. Such procedures are disclosed notably by patent U.S. Pat. No. 5,902,968, which is incorporated by reference herein where the main sensor is a gyrometer and the sensor for computing the angles of torsion is an accelerometer, patent application US 2004/0075650, which is incorporated by reference herein where the main sensor is a camera coupled to accelerometers, the combination allowing tilt correction, patent application US 2002/0140745, which is incorporated by reference herein where the main sensor is a GPS receiver and the tilt correction sensor a set of accelerometers and patent U.S. Pat. No. 7,158,118, which is incorporated by reference herein where the main sensor consists of one or more gyro meters and the tilt correction sensor consists of one or more accelerometers. This procedure has the drawback of providing noisy results insofar as the torsion angles are computed by using trigonometric calculations which are not adapted to fixed point/small memory processors which are preferably used in low cost air pointing devices.

A new way of correcting the tilt has been disclosed by US patent application published as US2009/0326857 to the assignee of the present application, which is incorporated by reference herein. According to this invention, instead of computing the tilt angle with the canonic trigonometric formulas, the measurements of the accelerometers are directly used to correct the measurements of the gyro sensors.

It has been found, though, that it may be advantageous to use only one accelerometer measurement at a moment in time to accomplish the tilt correction, so as to simplify the calculation of the correction and use less computing power, which is then freed for other tasks. Also, when an accelerometer axis is close to the vertical, its measurements are noisy, the values close to 1 lack precision and the roll correction along this axis is not accurate for angles higher than around 70°, leading to an overall bias affecting the cursor movements on the display.

SUMMARY OF THE INVENTION

The present invention solves this problem by providing a method for correcting the tilt using only the measurements of one accelerometer only at a moment in time.

To this effect, the invention provides an air pointing device comprising at least two angular rate sensors and two linear sensors capable of transmitting motion signals to a first processor, said processor being capable of transmitting processed signals to a second processor in connection with a display, wherein said signals control the movements of a virtual cursor on said display with the measurements of said angular rate sensors, said angular rate sensors measurements being corrected by said first processor for the tilt of said air pointing device, the value of said tilt correction being calculated by using only the measurements from one of said at least two linear sensors for a range of tilt values within a first half space.

In another embodiment, the invention provides an air pointing device comprising at least two angular rate sensors and two linear sensors capable of transmitting motion signals to a first processor, said processor being capable of transmitting processed signals to a second processor in connection with a display, wherein said signals control the movements of a virtual cursor on said display with the measurements of said angular rate sensors, said angular rate sensors measurements being corrected by said first processor for the tilt of said air pointing device, said tilt correction using only the measurements from a first linear sensor for a first range of tilt values and only the measurements from a second linear sensor for a second range of tilt values within a half space.

The invention also provides a method to use the air pointing devices in there various embodiments according to the invention and computer programs to implement the algorithms according to the invention.

The invention offers the other advantage of a better signal to noise ratio, notably when switching from one accelerometer to the other in different ranges of tilt values.

Also, the invention provides the application developer a choice of different algorithms to approximate the transformations of the accelerometers measurements which are needed to supplement the measurements themselves. Therefore, the developer can decide the level of precision of the approximation which is adequate for the level of computing power that is available.

The invention will be better understood and its various features and advantages will become apparent from the description of various embodiments and of the following appended figures.

Figure 3:
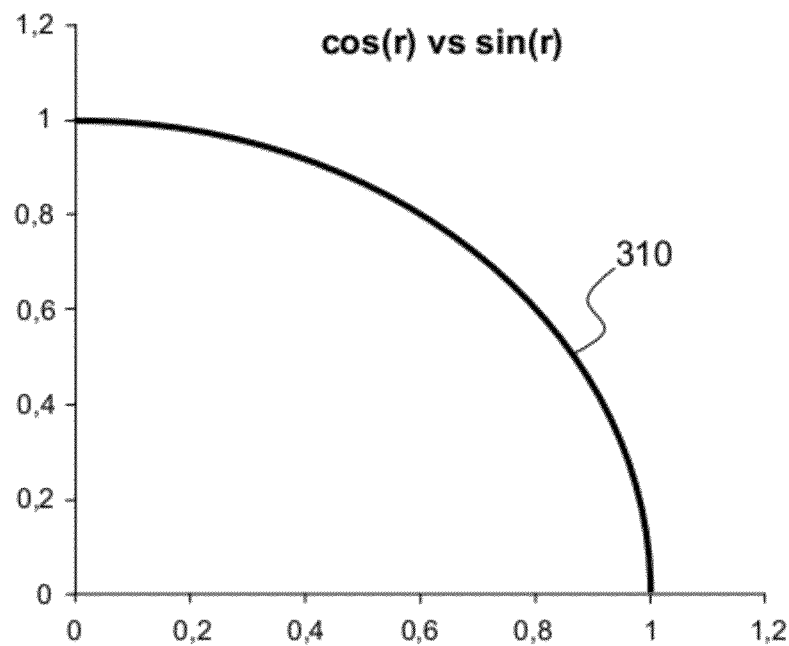
FIG. 3 represents the functional relationship between a first determination of a roll correction coefficient by a first accelerometer and a second determination of a roll correction coefficient by a second accelerometer when both corrections are applied simultaneously in a device of the prior art.
Figure 6:
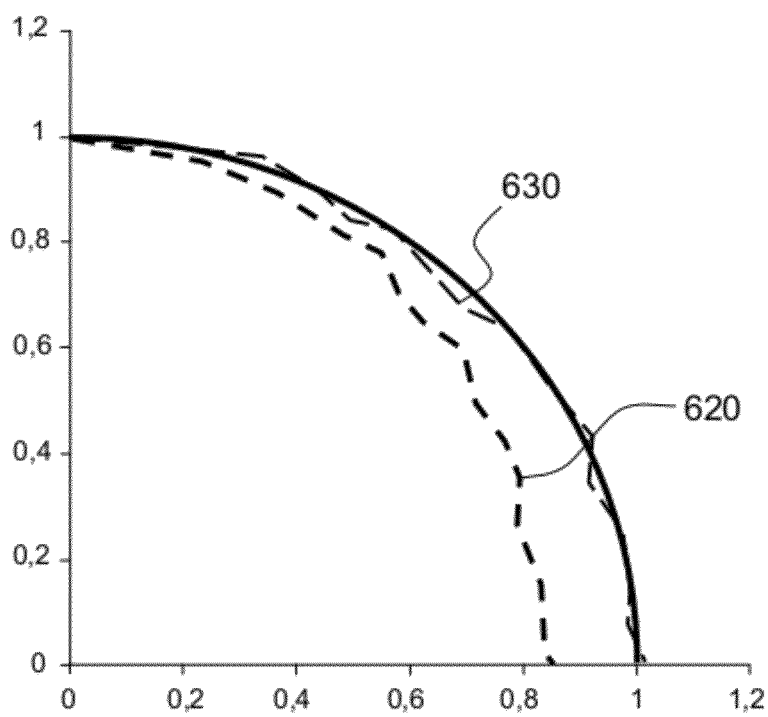
Figure 7:
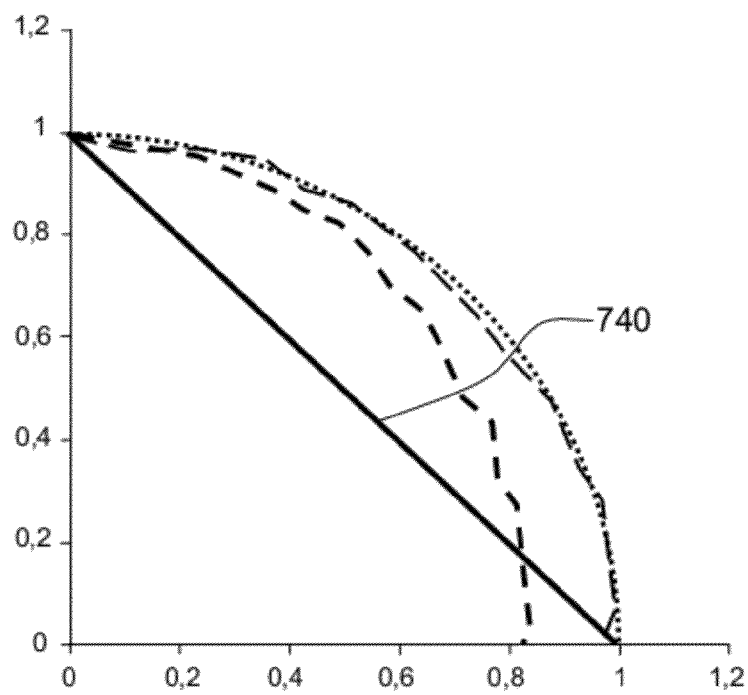
Figure 8:
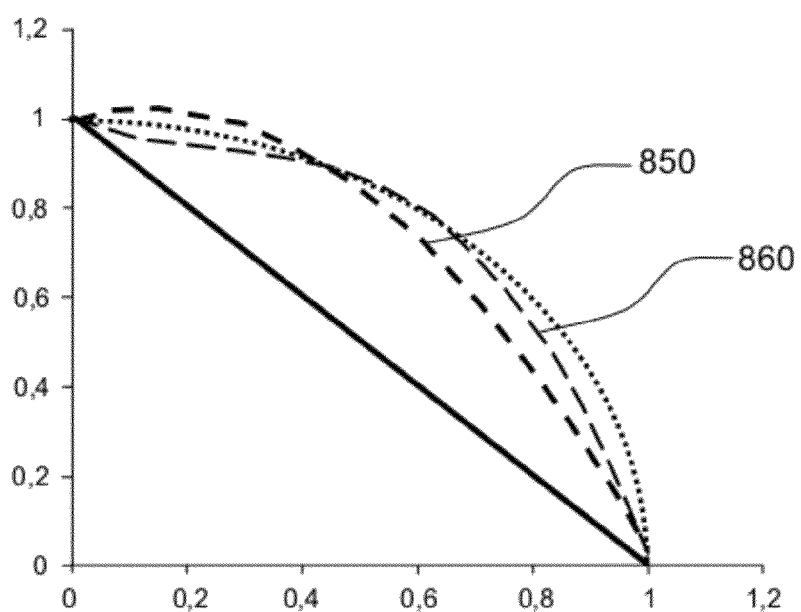
Figure 9:
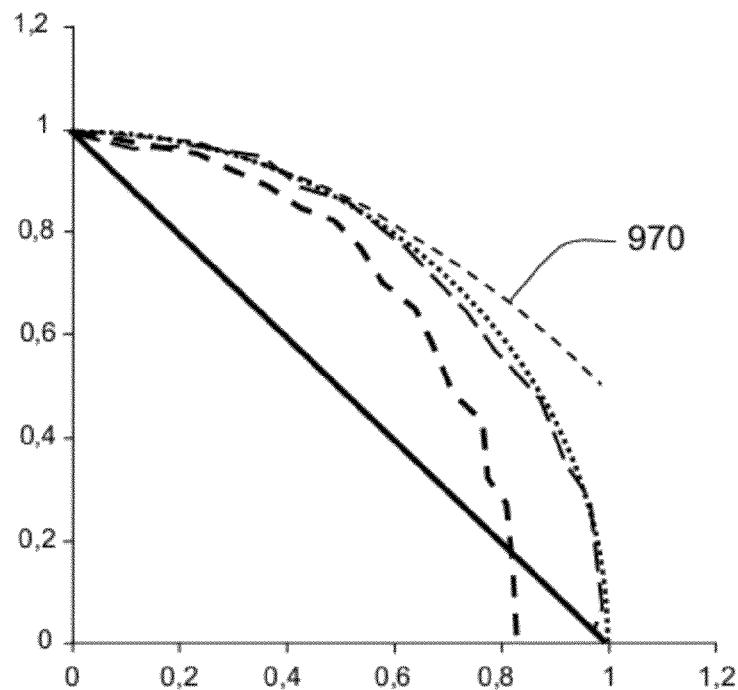
Figure 10:
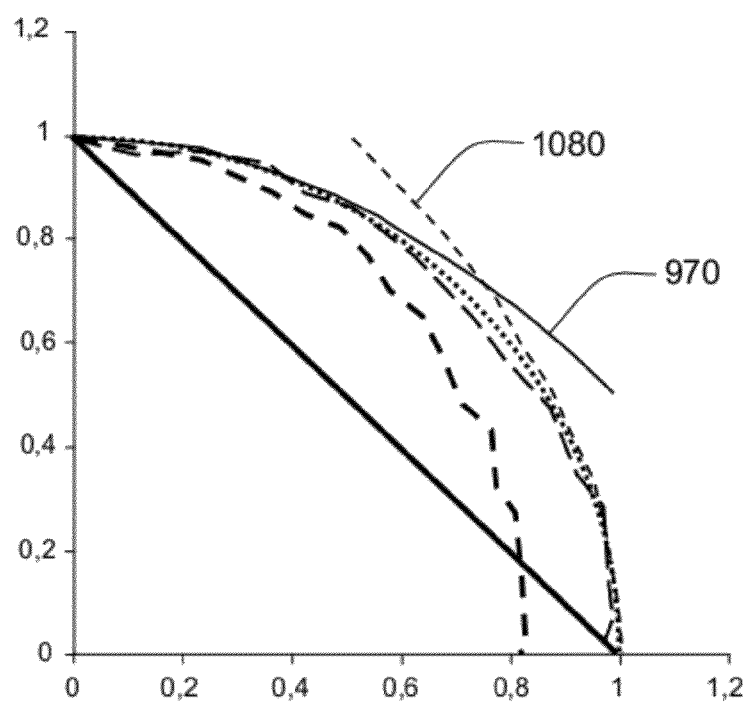
Figure 11A:
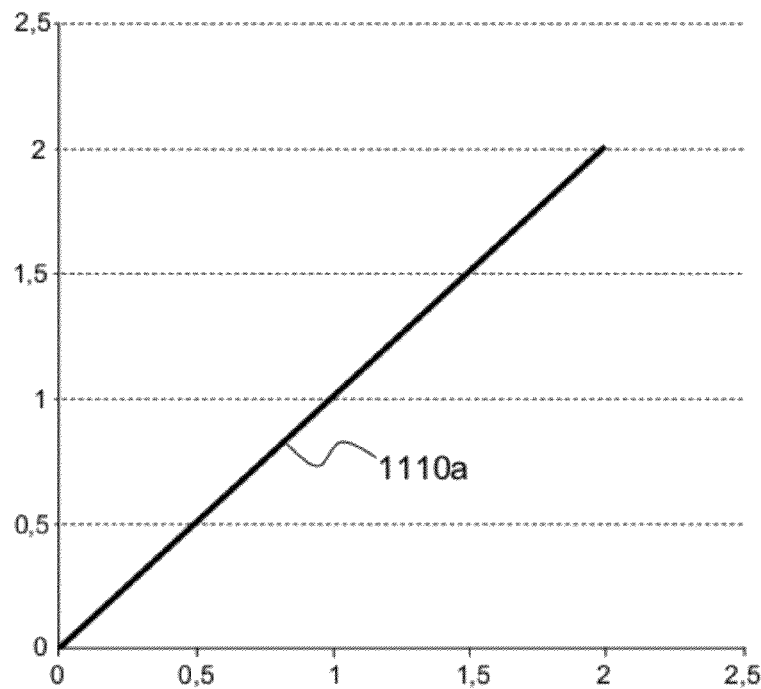
Figure 11B:
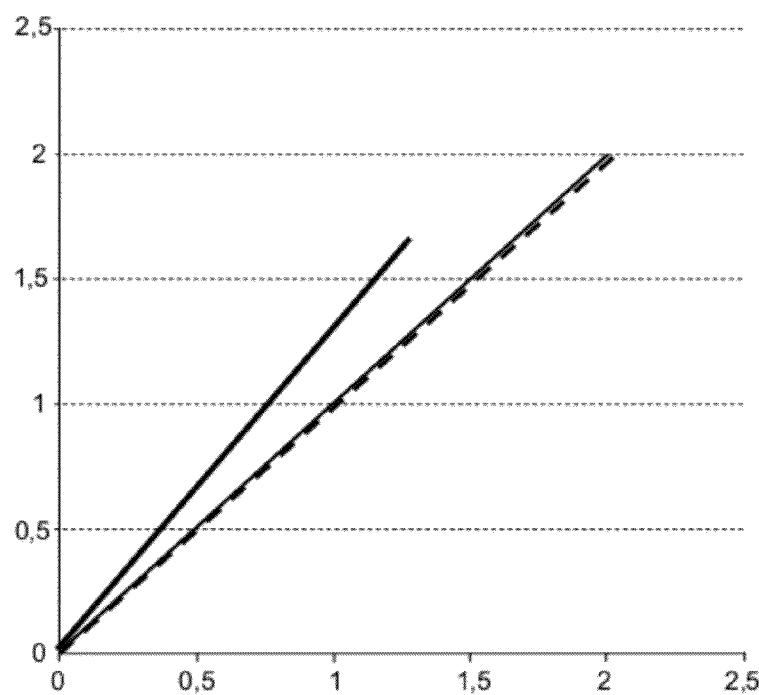
Figure 11C:
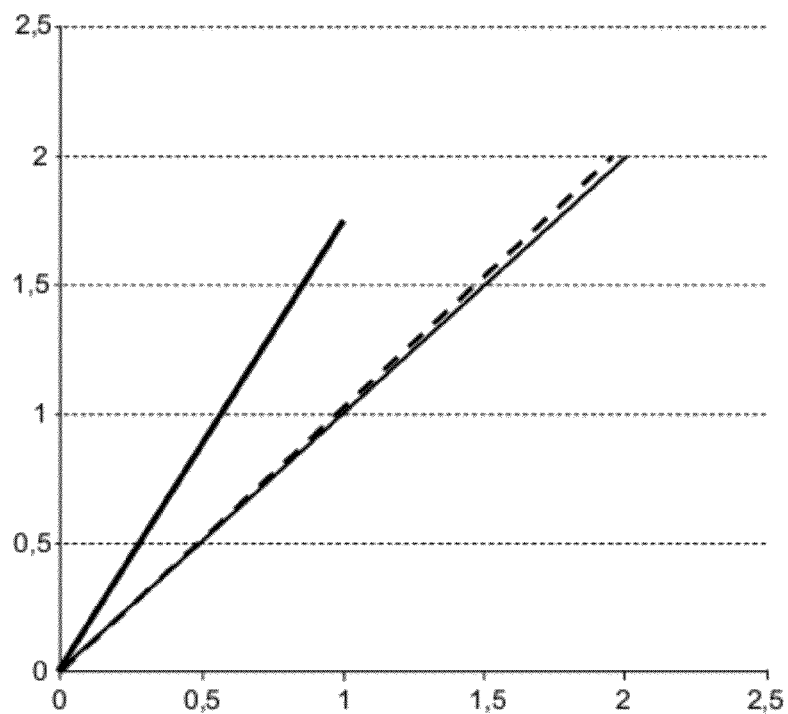
Figure 11D:
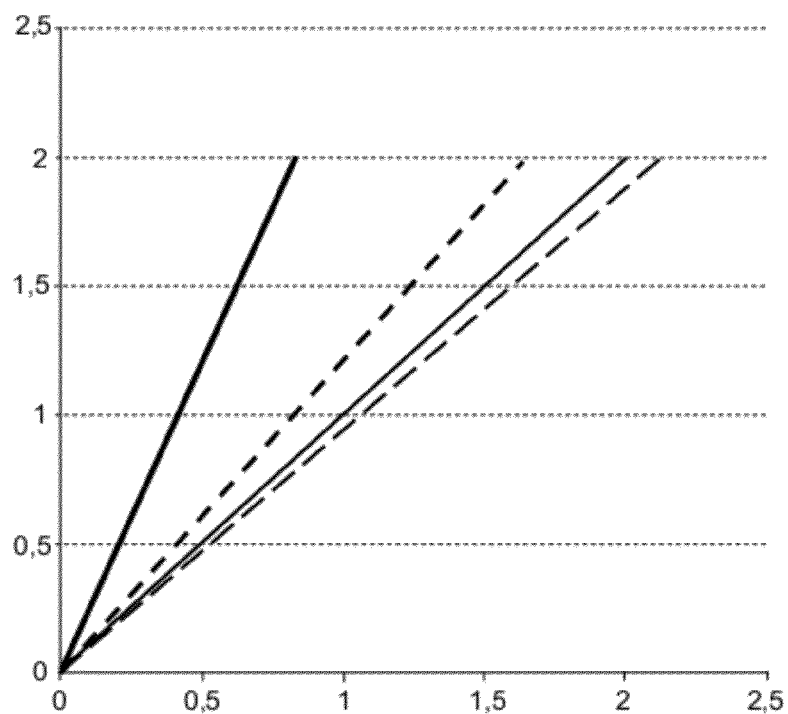
Figure 11E:
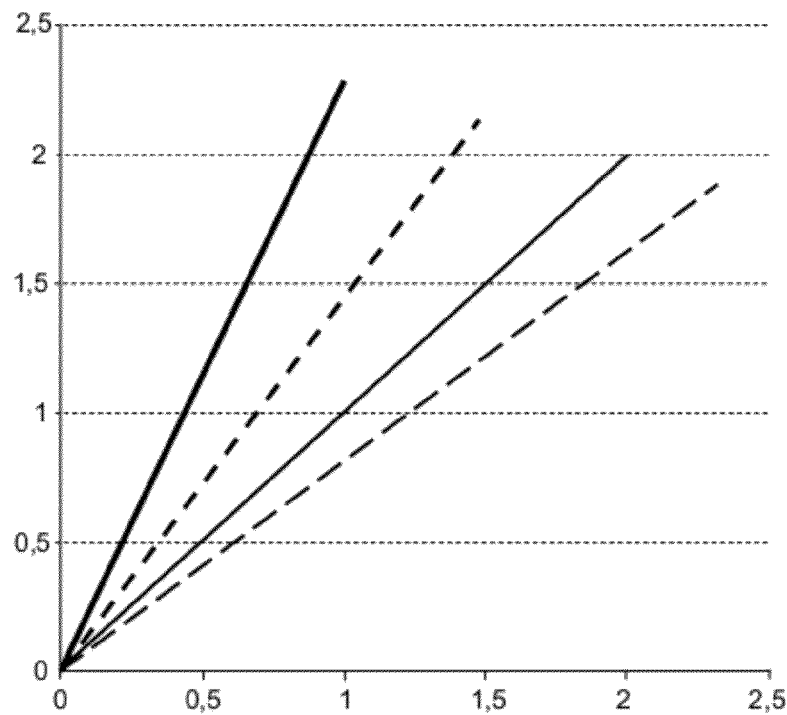
Figure 11F:
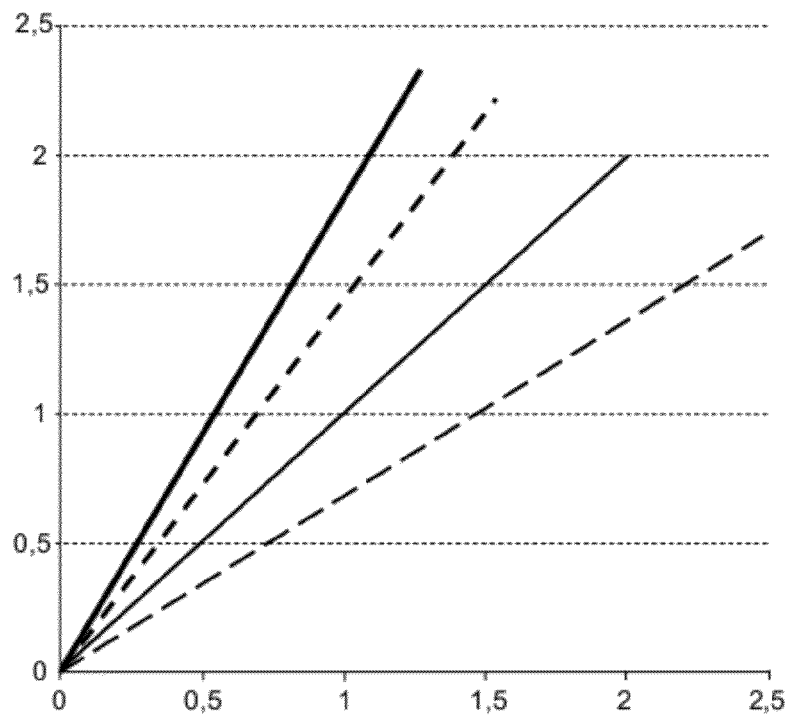
Figure 11G:
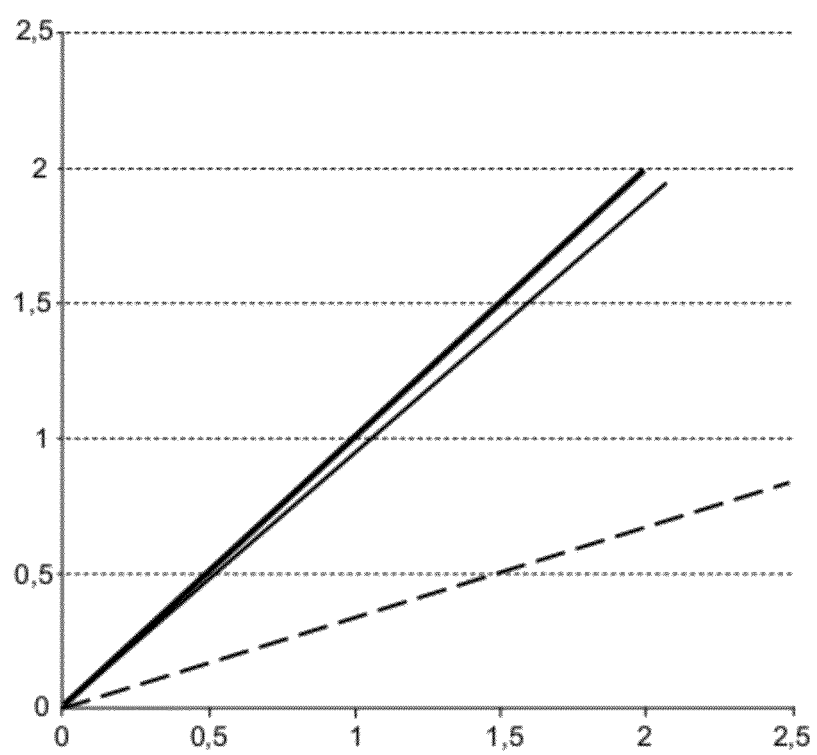
Figure 12A:
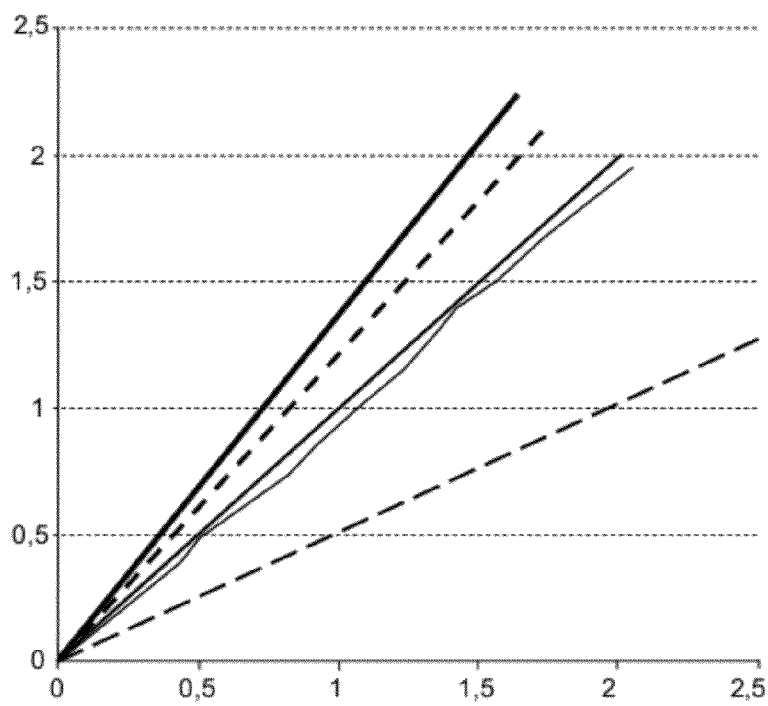
Figure 12B:
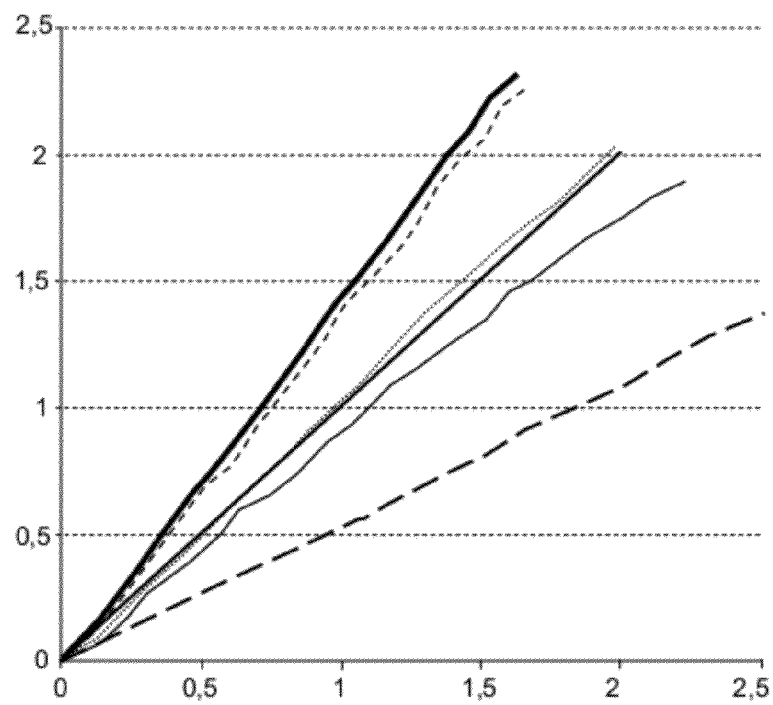

FIG. 6 adds to the curve of FIG. 3, the actual effect of the use of the a tan function and use of the roll correction with the output of the noisy accelerometers in another device of the prior art;

FIG. 7 adds to FIG. 6 the comparison with the theoretical effect of a first embodiment of the invention on the functional relationship between the two roll correction coefficients;

FIG. 8 displays the approximation of the two roll correction coefficients according to two other embodiments of the invention;

FIG. 9 displays the distorsion of the functional relationships between the two roll correction coefficients when the roll angle is larger than 70°;

FIG. 10 illustrates the distorsions of the functional relationships between the two roll correction coefficients when the roll angle is larger than 70°, when the measurements from the two accelerometers are swapped for different ranges of roll angles, according to an embodiment of the invention;

FIGS. 11*a* to 11*g* illustrate a comparison between the displacements along two axes of the cursor controlled by a device according to the prior art and various embodiments of the invention at different roll angles (respectively 0°, 20°, 30°, 45°, 60°, 70° and 90°) with no noise of the accelerometers taken into account;

FIGS. 12*a* and 12*b* illustrate a comparison between the displacements along two axes of the cursor controlled by a device according to the prior art and various embodiments of the invention at a roll angle of 80° with respectively a 5% and a 10% noise of the accelerometers taken into account.

Figure 13:
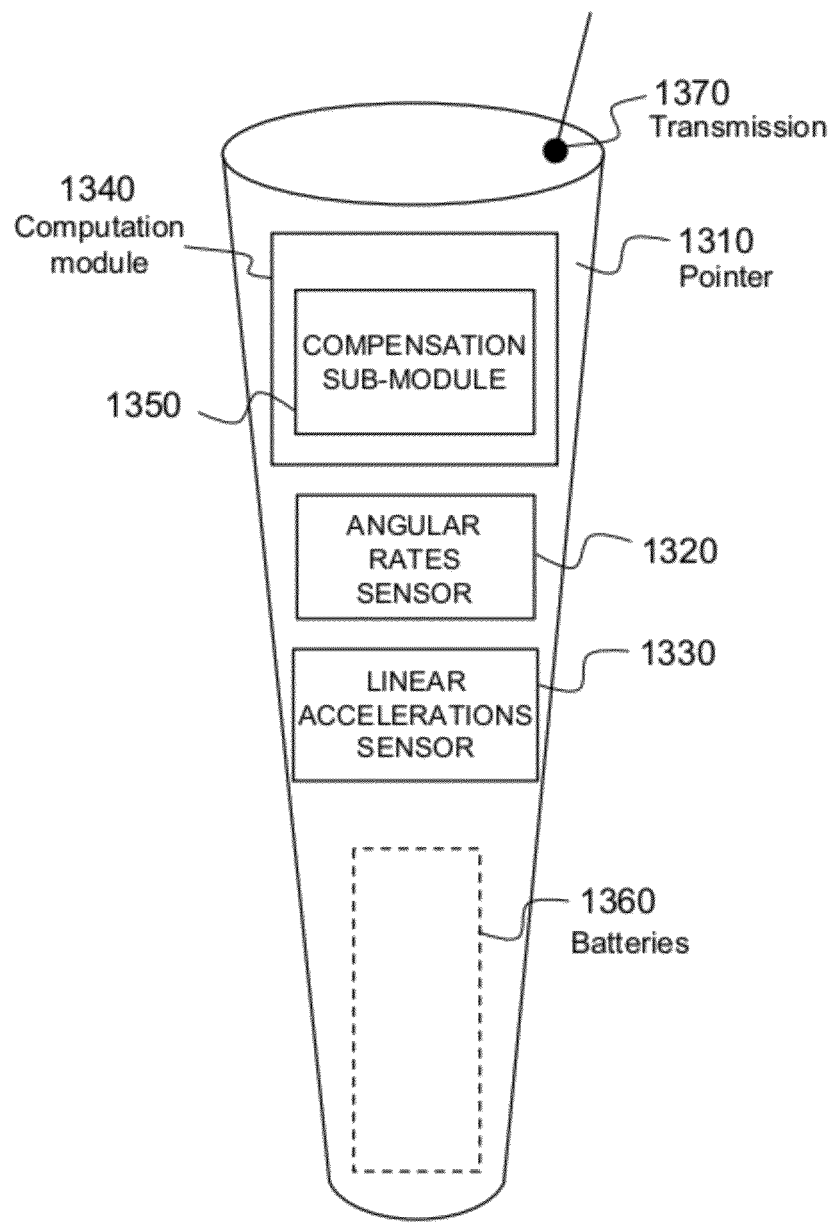

FIG. 13 represents in a simplified manner the hardware architecture of a pointer according to an embodiment of the invention.

The abbreviations and acronyms, used herein are as indicated in the table below.

| Acronym | Meaning |
| --- | --- |
| ADC | Analogue to Digital Converter |
| CC | Correction Curve |
| COC | Controlling Orientation Coordinates |
| CRF | Controlling Reference Frame |
| DOF | Degree Of Freedom |
| FP | Focus Point |
| SD | Sensing Device |
| SRF | Sensing Reference Frame |
| UH | User's Hand |
| WF | World Frame |
| WRF | Working Reference Frame |

Figure 1:
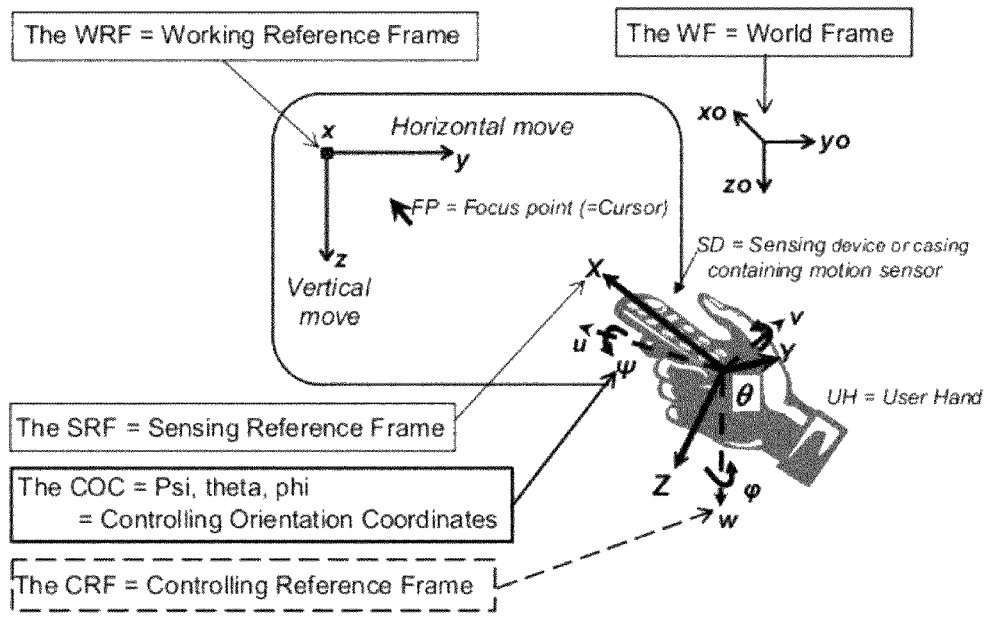
FIG. 1 represents a device controlling a display according to an embodiment of the invention and the different frames in which attitude and position coordinates can be referenced.

FIG. 1 represents a device controlling a display according to an embodiment of the invention and the different frames in which attitude and position coordinates can be referenced.

A remote control is mainly used to correctly map the movements of a User's Hand (UH) which bears or holds motion sensors or Sensing Devices (SD) to the movements of a "Focus Point" (FP) inside a Working Reference Frame (WRF). The different elements and frames of reference of the system are illustrated on FIG. 1.

An interesting property of the general system is that the User's brain is in-the-loop so that the displacement of FP is controlled by the intention of the user who uses the two angular movements (yaw and pitch in the WF) of his hand to move the cursor. When the FP moves in a plane, its movement in the WRF has two Degrees Of Freedom (DOF). In essence, the UH should move with the same number of DOF, so that the user is controlling the FP with as less effort as possible. The problem to be solved is therefore to map these 2 DOF of the UH (positioned by the mobile Controlling Reference Frame relatively to the World Frame (WF)) to 2 two DOF of the motionless WRF.

Sensors in the SD will be chosen mostly among oriented axial sensors which are mounted to be in a fixed position in the SRF. Preferably, the mapping which is done is:

From SD: sensing the angular velocity (for instance by means of a 2 axis gyro meter: gyro_y, gyro_z);
To FP: dx, dy small displacements in the WRF.

As is known by the man skilled in the art of motion capture, this mapping is done by the following transfer function:

$$dy = Ky*\text{gyro\_}z \quad \text{(Équation 1)}$$

$$dz = Kz*\text{gyro\_}y \quad \text{(Équation 2)}$$

Where:
dy is the elementary translation of the cursor along y axis oriented positively to the right on FIG. 1;
dz is the elementary translation of the cursor along z axis oriented positively to the bottom on FIG. 1;
Kx and Ky are constant values to adapt the sensitivity of the system (for instance to the screen resolution or to the velocity which is desired for the FP displacement, taking into account the sensitivity of the gyro sensor);
gyro_z is the value given by the gyro meter in response to a rotation around the Z axis, positively oriented from X to Y;
gyro_y is the value given by the gyro meter in response to a rotation around the Y axis, positively oriented from X to Z (which is not the direct orientation but which simplifies the calculation).

Usually, the SRF is fixed in relation to the CRF, but the situation could be different as the SD is most of the time not mechanically fixed to the UH, or the wrist could have rolled (ie rotated around the forearm axis) whereas the actual movement intended by the user to be meaningful is a horizontal displacement.

Figure 2:
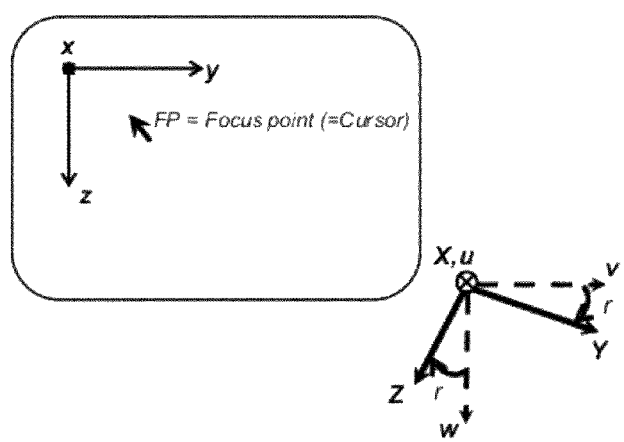
FIG. 2 represents the roll/tilt angle defined between the Controlling Orientation Coordinates and the Sensing Reference Frame, in an embodiment of the invention.

FIG. 2 represents the roll/tilt angle defined between the Controlling Orientation Coordinates and the Sensing Reference Frame, in an embodiment of the invention.

More specifically, we take an example where the SD has rolled inside the UH, ie, sensing axis Y,Z and actuating axis v,w are not aligned anymore, but separated by an angular deviation: roll=r angle as shown in FIG. 2. This roll introduces a mismatch between the axes of rotation of the UH and the measurements of the sensors which are not aligned anymore with said axes.

As disclosed among other prior art references by U.S. Pat. No. 7,158,118, this problem can be solved by a change of reference frame of an angle r by first measuring the tilt angle and then calculating a rotation matrix the coefficients of which are the sine and cosine of r.

This matrix is then applied to the gyro meter sensor values to compensate the roll. If the roll is known, and for a corrected motion mapping, the following classical equations are therefore applied:

$$dy = Ky*(\cos(r)*\text{gyro\_}z - \sin(r)*\text{gyro\_}y) \quad \text{(Équation 3)}$$

$$dz = Kz*(\sin(r)*\text{gyro\_}z + \cos(r)*\text{gyro\_}y) \quad \text{(Équation 4)}$$

Or:

$$dy = Ky*(\kappa*\text{gyro\_}z - \sigma*\text{gyro\_}y) \quad \text{(Équation 5)}$$

$$dz = Kz*(\sigma*\text{gyro\_}z + \kappa*\text{gyro\_}y) \quad \text{(Équation 6)}$$

FIG. 3 represents the functional relationship F between a first determination of a roll correction coefficient κ by a first accelerometer and a second determination of a roll correction coefficient σ by a second accelerometer in an embodiment of the invention.

$$\kappa = F(\sigma)$$

Considering the correction coefficients of gyro_z in the first and second equations (the correction coefficients of gyro_y are symmetrical), when r=roll goes from 0 to 90°, moving clockwise on the figure. The explanation is still valid for the other quadrants. The curve representing the functional relationship between the first and the second coefficients of respectively (Équation 3) and (Équation 4) is a circle bow 310 as displayed on FIG. 3. We call it the "Correction Curve" (CC).

The roll angle can be measured by an embedded accelerometer having at least 2 axes Ay and Az). We assume that Ay, Az are positively oriented in the same direction as the Y, Z axes, and provide values in G unit (Gravity=1 G).

In US '118, r is calculated from the following formula:

$$r = a\tan(Ay/Az) \quad \text{(Équation 7)}$$

The correction coefficients are then computed using sine and cosine transforms and then input in (Équation 3) and (Équation 4).

Figure 4:
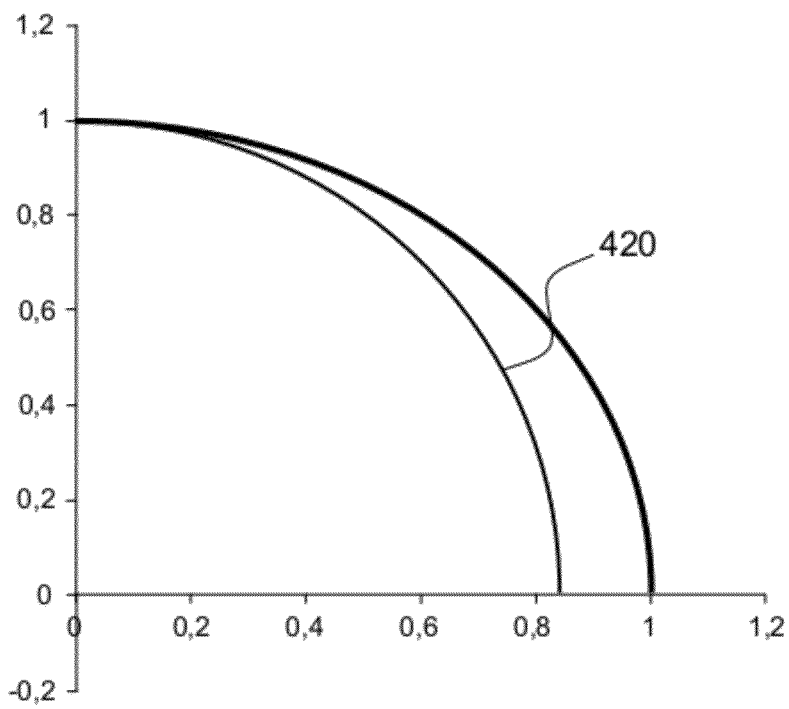
FIG. 4 illustrates the distortion in the relationship between the two correction coefficients when the roll angle is first computed using an a tan function.

FIG. 4 illustrates the distortion in the relationship between the two correction coefficients when the roll angle is first computed using an a tan function.

This distorsion appears when the roll gets far from 0° compared to the theory as shown on the new CC, 420, in FIG. 4.

It is also desirable to avoid the calculation of any trigonometric function when a fixed-point processor is used. Such drawbacks are illustrated in Mason (US2009/0326857), which is incorporated herein by reference. To avoid these drawbacks, the roll correction can be made without either computing the roll angle r or the sine and cosine coefficients derived from said roll angle.

Figure 5:
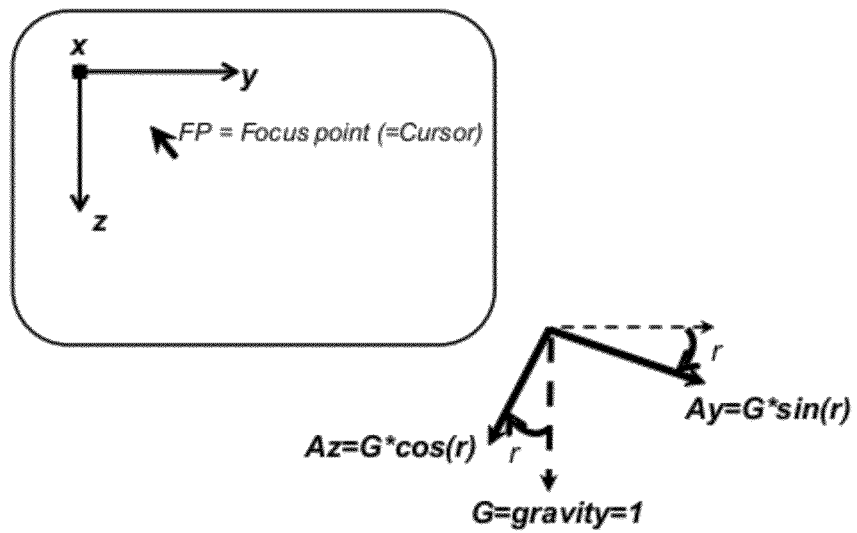
FIG. 5 illustrates the operation mode of a roll correction algorithm embodied in the device of the prior art of the type applying the corrections illustrated on FIGS. 3 and 4.

FIG. 5 illustrates the operation mode of a roll correction algorithm embodied in the device of the prior art of the type applying the corrections illustrated on FIGS. 3 and 4.

The readings of the two axes accelerometer are directly input as correction factors of the gyro meters readings, after or before a normalization by the norm of the acceleration vector.

The correction equations are then of the following algebraic linear form:

$$dy = Ky*(Az/Ayz*\text{gyro\_}z - Ay/Ayz*\text{gyro\_}y) \quad \text{(Équation 8)}$$

$$dz = Kz*(Ay/Ayz*\text{gyro\_}z + Az/Ayz*\text{gyro\_}y) \quad \text{(Équation 9)}$$

Where Ayz denotes the norm of Ay+Az vector in the (Ay,Az) plane. When SD has some roll but is horizontal on the X axis in the UH, this norm is equal to 1, thus leading to the following simplified equations:

$$dy = Ky*(Az*\text{gyro\_}z - Ay*\text{gyro\_}y) \quad \text{(Équation 10)}$$

$$dz = Kz*(Ay*\text{gyro\_}z + Az*\text{gyro\_}y) \quad \text{(Équation 11)}$$

We note that:
in a neutral position, r=0, Az=1 and Ay=0, thus getting back to (Équation 1) and (Équation 2);
when SD is upside down, r=180°, Az=−1, Ay=0, the gyro values are opposed in sign to the cursor displacement, because of the symmetrical transformation in relation to the central point;

when SD has rolled of a +90° value in the UH, Az=0, Ay=1, the two gyro axes are swapped to deal with each display axis. gyro_y is opposed in sign because our convention on this measurement was not the same direct convention as for gyro_z.

FIG. 6 adds to the curve of FIG. 3, the actual effect (ie, with noise) of the use of the a tan function and use of the direct the roll correction with the output of the accelerometers in another device of the prior art.

On this figure, we can see the CC 620 and 630 (respectively (Équation 10) and (Équation 11)). Note that in this example some Gaussian noise, approximately 50 mG or 5% (on an accelerometer of 1G of range), was added to the accelerometer simulated signal.

It is also interesting to note that when X and u axis remain aligned, the other axis in the roll plane is linked with the first one because they will always stay perpendicular:

$$Az = \sqrt{(1-Ay^2,)} \qquad \text{(Equation 12)}$$

FIG. 7 adds to FIG. 6 the comparison with the theoretical effect of a first embodiment of the invention on the functional relationship between the two roll correction coefficients.

It has been found advantageous to use the roll correction from only one accelerometer axis in a definite range of roll angle values. This is because the values of the measurement of this accelerometer close to 1 (ie 1 g, or roll #90°, in fact higher than 70°) are noisy. It is always possible to deduct the measurements along a second accelerometer axis from the measurements along the first accelerometer axis. The precision of the correction is therefore higher when one uses only the correction from one accelerometer, provided that the roll angle remains in an appropriate range for this axis.

Replacing Az by its function of Ay given by (Equation 12) we re-write (Equation 10) and (Equation 11) as follows:

$$Dy=Ky*(\sqrt{1-Ay^2})*gyro\_z-Ay*gyro\_y \qquad \text{(Equation 13)}$$

$$Dz=Kz*(Ay*gyro\_z+\sqrt{(1-Ay^2)}*gyro\_y) \qquad \text{(Equation 14)}$$

These equations are valid within a first half space, such as defined from 3π/2 to 2π plus from 0 to π/2 (Az>0). For the other half-space (from π/2 to 3π/2), Az is negative and the sign of the tilt correction must be changed.

One of the drawbacks of this solution, which mitigates its advantages, is that square-roots computation does not yield accurate results on a fixed-point processor.

A way to overcome this drawback and leverage the advantages of the invention is to calculate approximations of the square-root function.

There are a number of ways which can be used to approximate the algebraic transformations which are to be used to calculate the second roll correction coefficient from the first one. It is preferable to use polynomial approximations which use less computing power than other types of approximations.

A first option is to use a limited development of the function in the vicinity of one of the points of the function, for example using the Taylor-Young formulas. This option will be discussed further below in the specification.

A second option is to calculate the coefficients of a best fit polynomial adjusted to the values of the function as directly computed. A method which is often used is to find coefficients of the polynomial function which minimize the distance between $x_i,y_i$ and $x_i,P(x_i)$. This leads to the inversion of a matrix which is not square. Using the Penrose pseudo-inversion, one finds the coefficients of the polynomial.

See http://en.wikipedia.org/wiki/Moore%E2%80%93 Penrose pseudoinverse.

The best fit polynomial of a given order may be constrained to pass though a given point or a number of given points on the curve used for computing the best fit. These points can be weighted differently. One classical algorithm to find a best fit polynomial is to calculate the coefficients $\alpha_i$ of the polynomial which minimize the sum of the distances, $\epsilon$, between the function to be approximated and the polynomial in a number of points $x_i$, said distances being possibly weighted differently by coefficients $\mu_i$.

$$\varepsilon = \sum_j \mu_j \left\| \sum_{i=0}^n a_i x_j^i - \sqrt{1-x_j^\ell} \right\|^2$$

It may be for instance decided to overweight the θ=0° or θ=90° points so as to constrain the best fit to pass close to these two points or only one of these.

When the approximation is of the first order, things get simpler and we can simply replace the sine by AyRAW/CODE_G and the cosine by 1−AyRAW/CODE_G, where:

AyRAW is the raw data coming from the ADC of the accelerometer Ay

CODE_G is the value of the ADC output when accelerometer axis is vertical pointing down, (thus measuring 1 G if we consider physical units).

For convenience, we replace AyRAW/CODE_G by Ay. Therefore, Az=1−Ay, and the equations to calculate the cursor displacement becomes:

$$Dy=Ky*((1-Ay)*gyro\_z-Ay*gyro\_y) \qquad \text{(Équation 15)}$$

$$Dz=Kz*(Ay*gyro\_z+(1-Ay)*gyro\_y) \qquad \text{(Équation 16)}$$

The CC for this embodiment is shown as curve 740 on FIG. 7. A drawback of this solution is that, for a middle position where the roll r has a value of 45°, the approximation is quite far from theoretical correction.

But, as can be seen on FIG. 8, choosing a polynomial approximation of a higher order will significantly improve the precision.

FIG. 8 displays the approximation of the two roll correction coefficients according to two other embodiments of the invention.

One of these best fit polynomials to approximate $\sqrt{(1-Ay^2)}$ has coefficients which are calculated using one of the algorithms mentioned above, which are given by the table below:

$2^{nd}$ order−1,3($Ay^2$) 0,33(Ay) 1

$3^{rd}$ order−1,9($Ay^3$) 1,4($Ay^2$)−0,49(Ay) 1

The respective CC curves 850 and 860 are displayed on FIG. 8.

Of course, higher order polynomial approximations could be chosen, but it is clear that the advantages will stop balancing the drawbacks over a direct computation of the square-root solution. Depending on the type of processor, the adequate compromise between computer workload and accuracy will be different. It has been found that, for a 8-bits low-cost micro controller, the best compromise is to use a second order polynomial approximation.

FIG. 9 displays the distorsion of the functional relationships between the two roll correction coefficients when the roll angle is larger than 70°.

One of the drawbacks of the polynomial approximations using one single accelerometer axis across the full range of roll values is that the measurements are noisy when the accelerometer axis is close to the vertical. In this situation the information is not accurate for angle estimation. Different roll angles between 75° and 90° lead to very similar values on the measurements from the accelerometer (~1).

We can consider (Équation 12: when Ay is small, $Ay^2$=Ay (The CC curve is added on FIG. 9 under reference 970).

$$Az = 1 - \frac{1}{2} * Ay^2 \quad \text{(Équation 17)}$$

On FIG. 9, it can be seen that for angle larger than 70°, the assumption of small Ay is not true any longer, leading to a significant error.

According to an embodiment of the invention, a solution is to swap Ay to Az at roll=45°, ie Ay=Az=$\sqrt{2}$/2. The sensors swap is implemented as a result of the following test:

If $Ay<\sqrt{2}/2$ then: $dy=Ky*(f(Ay)*gyro\_z-Ay* gyro\_y)$ (Équation 18)

$dz=Kz*(Ay*gyro\_z+(f(Ay)*gyro\_y)$ (Équation 19)

If $Ay>=\sqrt{2}/2$ then: $dy=Ky*(Az*gyro\_z-f(Ay)*gyro\_y)$ (Équation 20)

$dz=Kz*(f(Az)*gyro\_z+Az*gyro\_y)$ (Équation 21)

f(x) can be one of the functions described hereinabove (1−x; 1−$x^2$/2; ... ). We can see the 2 curves, 970 and 1080, crossing on the CC representations for f(x)=1−$x^2$/2, which is the limited development of f(x)=$\sqrt{1-x^2}$ in the vicinity of θ=0° (respectively θ=90°, when swapping Ay and Az).

The Taylor-Young development of f(x) is given by the following formula,:

$$f(x) = \sum_{n=0}^{+\infty} \frac{f^n(x_0)}{n!}(x-x_0)^n$$

At the second order, we have:

$$f(x) = f(0) + f'(0)x + \frac{1}{2}f''(0)x^2 + o(x^2) \text{ or}$$

$$f(x) = 1 - \frac{1}{2}x^2 + o(x^2)$$

As an approximation of f(x), it is also possible to use $$g(x) = \lim_{n \to +\infty}(x_n)$$

where ($x_n$) is the suite of the values for which the difference between the function f(x) and its limited development of the first order is null to approximate f(x). In principle, this is equivalent to using the tangent to the function at a given point to generate the suite by iteration, using the following formula:

$$x_{n+1} = x_n - \frac{f(x_n)}{f'(x_n)}$$

This calculation is known as the Newton-Raphson algorithm and convergence is quite fast. Therefore, in practical terms n can be lower than 10.

FIGS. 11*a* to 11*g* illustrate a comparison between the displacements along two axes of the cursor controlled by a device according to the prior art and various embodiments of the invention at different roll angles (respectively 0°, 20°, 30°, 45°, 60°, 70° and 90°) with no noise of the accelerometers taken into account.

We have made some simulations with different parameters that can be changed:
the roll angle;
the % of Gaussian noise on accelerometer
the different methods embodying the inventions, including those of the prior art.

What we compute is, taking into account the roll, the accelerometers and gyrometers measurements, an angular velocity of the UH vertically and horizontally, simultaneously and with the same values. This leads to a cursor movement that should follow a diagonal. dy and dz are then calculated, using the different methods, to be compared to the ideal diagonal, 1110*a*.

FIGS. 12*a* and 12*b* illustrate a comparison between the displacements along two axes of the cursor controlled by a device according to the prior art and various embodiments of the invention at a roll angle of 80° with respectively a 5% and a 10% noise of the accelerometers taken into account.

We notice that all the methods that use only on one axis accelerometer for all roll values leads to substantial errors when the roll angle is higher than 70°. Therefore, the swap method is thus a good compromise (with function 1−$x^2$/2).

It is possible to use the different approximation methods either with a one-accelerometer only implementation or with a one-accelerometer-at-a-time implementation, choosing for instance a best fit polynomial with minimisation of a weighted sum of distances between the approximation and the approximated function for selected points, limited developments of any order in the vicinity of selected points or a Newton-Raphson iteration procedure.

For instance, it may be possible to use the measurements from one accelerometer axis from 0 to π/4, with a linear interpolation in-between and the measurements from the other accelerometer axis from π/4 to π/2, with another linear interpolation in-between. It is also possible to use more precise approximations in conjunction with an axis swap at π/4 or not far from this value. One of the advantages of the swap implementation is that the necessary disambiguation of the half space in which the pointer is located (face or bottom up) can be accomplished more easily in this embodiment. If the z axis is used from 0 to π/4, the sign of this axis measurement continuously gives the half space orientation as well as the absolute value of the tilt correction. Therefore, a single axis is necessary at the same time. At the end of the pointer excursion (when the roll/tilt angle reaches π/4), the value of the measurement on this z axis can be saved in a register of a memory to be used to determine the half space in which the pointer is oriented, when the accelerometer axis which is used to calculate the tilt correction is then swapped to the y axis, approximately at a roll angle of π/4 Therefore, also in this semi-quadrant, only one axis is used to compute a value of a tilt correction which is disambiguated.

It is indeed also possible to use a table in the memory of the computer with the values of the function f(x)=$\sqrt{1-x^2}$ with a sufficient number of values and to compute a simple linear interpolation in between.

FIG. 13 represents in a simplified manner the hardware architecture of a pointer according to an embodiment of the invention.

The pointing device 1310 or pointer advantageously has the form and the shape of a television remote control, that is to say it is of elongate form, able to be held in the user's hand.

Alternatively, it may otherwise be fixed to one of the user's limbs, notably in games applications. The pointer is associated with a mobile element able to move in a plane surface, for example a screen or a writing surface. The movements of this mobile element are controlled by the movements of the pointer. The pointer is advantageously provided with buttons on several of its faces to control the functions to which access is made possible by the remote control. The pointer comprises a power supply 1360 and a channel of transmission 1370 for the object to be controlled. Radiofrequency transmission can be effected with a Bluetooth waveform and protocol or with a Wi-Fi waveform and protocol (Standard 802.11g). Transmission can be performed by infra-red or by radiofrequency. The transmitted signals are the commands corresponding on the one hand to the depression of one of the buttons present on the body of the pointer, which triggers the execution of a function and on the other hand to the sensing of the movement of the pointer so as to control the movements of a cursor on the control screen of the object to be controlled. These control signals are generated by the computation module 1340 which comprises a sub-module 1350 for compensating for the torsion imparted to the pointer by the user. This computation module comprises a microprocessor, for example a DSP Texas Instruments TMS320VC5509 for the most demanding applications in terms of computation time, or a 32-bit microcontroller with ARM core, for example one of those from the STR9 family, notably the STR9F12FAW32 from STM. The computation module also preferably comprises a flash memory necessary for storing the code to be executed and the permanent data which it requires and a dynamic work memory. The computation module receives as input the outputs from two types of sensors. On the one hand, angular velocity sensors 1320 have the function of measuring the rotations of the pointer in relation to two or three axes. These sensors will preferably be gyrometers. It may be a two-axis gyrometer or a three-axis gyrometer. It is for example possible to use the gyrometers provided by Analog Devices with the reference ADXRS300. But any sensor capable of measuring angular rates or velocities is usable. It is in particular possible to envisage a camera whose image processing compares successive images so as to deduce therefrom the displacements which are combinations of translations and of rotations. It is then necessary, however, to have a substantially greater computational capability than that needed by a gyrometer. It is also possible to use magnetometers, measurement of whose displacement with respect to the terrestrial magnetic field makes it possible to measure the rotations with respect to the frame of reference of this field, it is for example possible to use the magnetometers with the reference HMC1001 or HMC1052 from the company Honeywell or KMZ41 from the company NXP. Whichever sensors are used, their measurements are read in the frame of reference of the pointer. If this frame of reference is not identical, to within a position translation, to the frame of reference of the user and to the frame of reference of the pointer, the measurements suffer a bias which will give rise to inconsistent displacements of the mobile element. This is why within the computation module 1340 is provided a compensation sub-module 1350 the function of which is to compute the displacements of the mobile element in the plane surface as a function of the displacements of the limb of the user holding the pointer, said function being corrected for the impact of the torsion imparted to the pointer by the user. The compensation sub-module recovers as input the outputs from a second sensor 1330 which measures the linear accelerations of the pointer $a_X$, $a_Y$, $a_Z$. Preferably, the sensor 1330 is a three-axis accelerometer. Advantageously, the sensors 1320 and 1330 are both produced by MEMS (Micro Electro Mechanical Systems) technology, optionally within one and the same circuit (for example reference accelerometer ADXL103 from Analog Devices, LIS302DL from Thomson, reference gyrometer MLX90609 from Melixis, ADXRS300 from Analog Devices). If appropriate, the MEMS module will be situated near the center of gravity of the pointing device, except if a particular embodiment, such as that illustrated by FIG. 5, justifies a different positioning. It will be noted, however, that a camera supplemented with an image processing device can also replace the two sensors 1320 and 1330, the angular rates/velocities and linear accelerations of displacement of the pointer being deducible from a correlation of successive images.

The examples disclosed in this specification are only illustrative of some embodiments of the invention. They do not in any manner limit the scope of said invention which is defined by the appended claims.

The invention claimed is:

1. An air pointing device comprising at least two angular rate sensors and two linear sensors capable of transmitting motion signals to a first processor, said processor being capable of transmitting processed signals to a second processor in connection with a display, wherein said signals control movements of a cursor on said display with measurements of said angular rate sensors, said angular rate sensors' measurements being corrected by said first processor for a tilt of said air pointing device, a value of said tilt correction being calculated by using only measurements from one of said at least two linear sensors for a range of tilt values within a first half space.

2. The air pointing device of claim 1, wherein the value of said tilt correction is modified by a sign of a measurement of another one of said at least two linear sensors within a second half space.

3. The air pointing device of claim 1, wherein said tilt correction uses for a range of tilt values raw measurements $A_y$ from one linear sensor and an algebraic transformation of said measurements of a form $\sqrt{1-A_y^2}$.

4. The air pointing device of claim 1, wherein said tilt correction uses for a range of tilt values raw measurements $A_y$ from one linear sensor and an approximation of an algebraic transformation of said measurements of a form 29 $\sqrt{1-A_y^2}$.

5. The air pointing device of claim 4, wherein said approximation is a polynomial approximation of said algebraic transformation.

6. The air pointing device of claim 5, wherein said polynomial approximation is of a form $1-A_y$.

7. The air pointing device of claim 5, wherein said polynomial approximation is a best fit polynomial, coefficients of which are calculated to minimize a weighted sum of distances between values of the algebraic transformation at selected points and values of the polynomial at the same points.

8. The air pointing device of claim 5, wherein said polynomial approximation is a series of limited developments of the algebraic transformation in a number of selected points.

9. The air pointing device of claim 4, wherein said approximation is calculated at a given point as a limit for a definite precision of zeros of a difference between the algebraic transformation and its first order limited development.

10. An air pointing device comprising at least two angular rate sensors and two linear sensors capable of transmitting motion signals to a first processor, said processor being capable of transmitting processed signals to a second processor in connection with a display, wherein said signals control movements of a cursor on said display with measurements of said angular rate sensors, said angular rate sensors' measurements being corrected by said first processor for a tilt of said air pointing device, said tilt correction using only measurements from a first linear sensor for a first range of tilt values and only measurements from a second linear sensor for a second range of tilt values within a half space.

11. The air pointing device of claim 10, wherein said first and second tilt corrections respectively use for said first and second ranges of tilt values raw measurements $A_y$ and $A_z$ from said first and second linear sensors and algebraic transformations of said measurements of forms $\sqrt{1-A_y^2}$ and $\sqrt{1-A_z^2}$.

12. The air pointing device of claim 10, wherein said first and second tilt corrections respectively use for said first and second ranges of tilt values raw measurements $A_y$ and $A_z$ from said first and second linear sensors and approximations of algebraic transformations of said measurements of forms $\sqrt{1-A_y^2}$ and $\sqrt{1-A_z^2}$.

13. The air pointing device of claim 12, wherein said approximations are polynomial approximations of said algebraic transformations.

14. The air pointing device of claim 13, wherein said polynomial approximations are of a form $1-A_y$ for the first linear sensor and of a form $1-A_z$ for the second linear sensor.

15. The air pointing device of claim 13, wherein said polynomial approximations are best fit polynomials, coefficients of which are calculated to minimize a weighted sum of distances between values of the algebraic transformation at selected points and values of the polynomial at the same points.

16. The air pointing device of claim 13, wherein said polynomial approximations are series of limited developments of the algebraic transformations in a number of selected points.

17. The air pointing device of claim 13, wherein said approximation are calculated at given points as limits for a definite precision of zeros of a difference between the algebraic transformations and their first order limited developments.

18. An air pointing method comprising a step of processing in a first processor motion signals from at least two angular rate sensors and at least two linear sensors, a step of transmitting the output from said first processor to a second processor in connection with a display, a step of controlling movements of a cursor on said display with measurements of said angular rate sensors, said angular rate sensors' measurements being corrected by said first processor for a tilt of said air pointing device, a value of said tilt correction being calculated by using only measurements from one of said at least two linear sensors for a range of tilt values within a first half space.

19. An air pointing method comprising a step of processing in a first processor motion signals from at least two angular rate sensors and at least two linear sensors, a step of transmitting output from said first processor to a second processor in connection with a display, a step of controlling movements of a cursor on said display with measurements of said angular rate sensors, said angular rate sensors' measurements being corrected by said first processor for a tilt of said air pointing device, said tilt correction using only measurements from a first linear sensor for a first range of tilt values and only measurements from a second linear sensor for a second range of tilt values, said first and second range of tilt values within a first half space.

20. The air pointing method of claim 19, wherein said first range of tilt values covers a first half of a quadrant and said second range of tilt values covers a second half of a quadrant within said first half space.

21. A computing device comprising a module stored in an air pointing device comprising at least two angular rate sensors and at least one linear sensor capable of transmitting motion signals to a first processor, said processor being capable of transmitting processed signals to a second processor in connection with a display, wherein a second module uses said signals to control movements of a cursor on said display with measurements of said angular rate sensors, said angular rate sensors' measurements being corrected by said first processor for a tilt of said air pointing device, said tilt correction using only measurements from one linear sensor for a range of tilt values within a first half space.

22. A computing device comprising a module stored in an air pointing device comprising at least two angular rate sensors and at least two linear sensors capable of transmitting motion signals to a first processor, said processor being capable of transmitting processed signals to a second processor in connection with a display, wherein a second module uses said signals to control movements of a cursor on said display with measurements of said angular rate sensors, said angular rate sensors measurements being corrected by said first processor for a tilt of said air pointing device, said tilt correction using only measurements from a first linear sensor for a first range of tilt values and only measurements from a second linear sensor for a second range of tilt values, said first and second range of tilt values within a first half space.

\* \* \* \* \*